United States Patent
Sankai

(10) Patent No.: US 10,265,857 B2
(45) Date of Patent: Apr. 23, 2019

(54) WEARING-TYPE MOVEMENT ASSISTANCE DEVICE

(71) Applicants: CYBERDYNE INC., Tsukuba-shi, Ibaraki (JP); UNIVERSITY OF TSUKUBA, Tsukuba-shi, Ibaraki (JP)

(72) Inventor: Yoshiyuki Sankai, Tsukuba (JP)

(73) Assignees: CYBERDYNE INC., Tsukuba-Shi, Ibaraki (JP); UNIVERSITY OF TSUKUBA, Tsukuba-Shi, Ibaraki (JP)

( * ) Notice: Subject to any disclaimer, the term of this patent is extended or adjusted under 35 U.S.C. 154(b) by 178 days.

(21) Appl. No.: 15/318,243

(22) PCT Filed: Jun. 12, 2015

(86) PCT No.: PCT/JP2015/067035
§ 371 (c)(1),
(2) Date: Dec. 12, 2016

(87) PCT Pub. No.: WO2015/190599
PCT Pub. Date: Dec. 17, 2015

(65) Prior Publication Data
US 2017/0144309 A1    May 25, 2017

(30) Foreign Application Priority Data
Jun. 13, 2014    (JP) .................. 2014-122483

(51) Int. Cl.
*G06F 19/00*    (2018.01)
*B25J 9/16*    (2006.01)
(Continued)

(52) U.S. Cl.
CPC ........... *B25J 9/1694* (2013.01); *B25J 9/0006* (2013.01); *B25J 9/0009* (2013.01); *B25J 17/00* (2013.01); *Y10S 901/15* (2013.01); *Y10S 901/46* (2013.01)

(58) Field of Classification Search
CPC ...... B25J 9/1694; B25J 9/0006; B25J 9/0009; B25J 17/00; Y10S 901/15; Y10S 901/46
(Continued)

(56) References Cited

U.S. PATENT DOCUMENTS

| 8,419,804 B2 * | 4/2013 | Herr .......................... A61F 2/60 623/24 |
| 9,308,642 B2 * | 4/2016 | Sugar ..................... B25J 9/0006 |
| 9,844,447 B2 * | 12/2017 | van der Merwe ........ A61F 2/54 |

(Continued)

FOREIGN PATENT DOCUMENTS

| FR | 2993811 A1 | 1/2014 |
| JP | 2008-295696 A | 5/2007 |

(Continued)

OTHER PUBLICATIONS

Europe Patent Office, "Search Report for European Patent Application No. 15806572.2," dated Jan. 23, 2018.
(Continued)

*Primary Examiner* — Ronnie N Mancho
(74) *Attorney, Agent, or Firm* — Manabu Kanesaka

(57) ABSTRACT

A wearing-type movement assistance device includes a frame to be worn on an upper limb of a wearer, a drive unit provided in each of joints of the frame, a biomedical signal detection unit detecting a biological potential signal of the wearer, a joint angle detection unit detecting an angle of each joint, and a control unit controlling the drive unit based on the biological potential signal and the angle of each joint. The frame includes a vertical frame, a shoulder frame that is laterally provided in a shoulder width direction from an upper end of the vertical frame, a first arm frame having one end coupled to the shoulder frame via a shoulder joint unit, and a second arm frame having one end coupled to the other end of the first arm frame via an intermediate joint unit and the other end connected to an elbow joint unit.

14 Claims, 12 Drawing Sheets

(51) Int. Cl.
  *B25J 9/00*      (2006.01)
  *B25J 17/00*     (2006.01)
(58) Field of Classification Search
  USPC .......................................................... 700/254
  See application file for complete search history.

(56) References Cited

U.S. PATENT DOCUMENTS

| | | | |
|---|---|---|---|
| 2007/0225620 | A1 | 9/2007 | Carignan et al. |
| 2008/0009771 | A1* | 1/2008 | Perry ..................... B25J 9/0006 600/587 |
| 2010/0217163 | A1 | 8/2010 | Sankai |
| 2011/0214524 | A1* | 9/2011 | Jacobsen .................. A61F 2/68 74/490.04 |
| 2011/0251533 | A1 | 10/2011 | Han et al. |
| 2012/0010749 | A1* | 1/2012 | van der Merwe ........ A61F 2/54 700/264 |
| 2012/0184880 | A1 | 7/2012 | Doyle |
| 2014/0200715 | A1* | 7/2014 | Sugar ......................... B25J 9/00 700/245 |
| 2014/0330431 | A1* | 11/2014 | Hollander ............. B25J 9/0006 700/245 |
| 2015/0141889 | A1* | 5/2015 | Ha ........................ A61F 5/0102 602/16 |
| 2015/0173918 | A1* | 6/2015 | Herr .......................... A61F 2/72 623/25 |
| 2016/0023350 | A1* | 1/2016 | Holgate .................... A45F 3/00 248/550 |
| 2017/0027803 | A1* | 2/2017 | Agrawal ............... A61B 5/6828 |
| 2017/0042717 | A1* | 2/2017 | Agrawal ................ A61B 17/70 |
| 2017/0119132 | A1* | 5/2017 | Pruess ....................... A45F 3/08 |
| 2017/0128311 | A1* | 5/2017 | Lee ......................... F16H 19/06 |

FOREIGN PATENT DOCUMENTS

| | | |
|---|---|---|
| JP | 2013-052192 A | 3/2013 |
| JP | 2014-503320 A | 2/2014 |
| WO | 95/32842 A2 | 12/1995 |
| WO | 2014/024506 A1 | 2/2014 |

OTHER PUBLICATIONS

PCT/ISA/210, "International Search Report for International Application No. PCT/JP2015/067035," dated Aug. 18, 2015.

* cited by examiner

WEARING-TYPE MOVEMENT ASSISTANCE DEVICE

TECHNICAL FIELD

The present invention relates to a wearing-type movement assistance device that assists anti-gravity work using upper limbs.

BACKGROUND ART

In a construction site or the like, there are cases where work is conducted while an upper limb lifted posture, in which a tool such as a machine tool or a camera is held up, being maintained. Such anti-gravity work using the upper limb applies a heavy load is applied to muscle groups of the upper limb, and thus continuous work is difficult. Particularly, when a tool with a heavy weight is used, the working efficiency decreases significantly.

For this reason, as a device that provides movement assistance for anti-gravity work, a wearing-type upper limb assistance device to be worn according to the skeletal outline a worker has been proposed (see, for instance, PTL 1).

PTL 1: Japanese Unexamined Patent Application Publication No. 2008-295696

SUMMARY OF INVENTION

However, the above-mentioned conventional upper limb assistance device does not sufficiently ensure a degree of freedom of the upper body necessary for work on a ceiling surface or the like, and cannot cope with movement of the upper limbs and the trunk necessary for the work in some cases. In addition, there are some cases where a body type difference such as a difference in length, thickness of the limbs between wearers cannot be coped with.

Solution to Problem

It is an object of the present invention to provide a wearing-type movement assistance device capable of sufficiently ensuring a degree of freedom of the upper body and coping with a body type difference between wearers.

According to one aspect of the present invention, there is provided a wearing-type movement assistance device including a frame to be worn on an upper limb of a wearer, a drive unit provided in each of joints of the frame, a biomedical signal detection unit detecting a biological potential signal of the wearer, a joint angle detection unit detecting an angle of each joint, a control unit controlling the drive unit based on the biological potential signal and the angle of each joint, wherein the frame includes a vertical frame that extends in a vertical direction, a shoulder frame that is laterally provided in a shoulder width direction from an upper end of the vertical frame, a first arm frame having one end coupled to an end of the shoulder frame via a shoulder joint unit, and a second arm frame having one end coupled to the other end of the first arm frame via an intermediate joint unit and the other end connected to an elbow joint unit, and the shoulder joint unit, the intermediate joint unit, and the elbow joint unit being provided with the drive unit.

According to one aspect of the present invention, the shoulder joint unit has a horizontal joint and a sagittal plane joint, the sagittal plane joint is provided with the drive unit, and the horizontal joint is a passive joint.

According to one aspect of the present invention, the horizontal joint of the shoulder joint unit is provided rearwardly of the sagittal plane joint.

According to one aspect of the present invention, a spring tension is applied to the horizontal joint via a wire so that a rotational axis of the sagittal plane joint is perpendicular to a sagittal plane.

According to one aspect of the present invention, the intermediate joint unit has a horizontal joint and a sagittal plane joint, the sagittal plane joint is provided with the drive unit, and the horizontal joint is a passive joint.

According to one aspect of the present invention, the elbow joint unit has a sagittal plane joint, and the sagittal plane joint is provided with the drive unit.

According to one aspect of the present invention, a first cuff applied to an upper arm of a wearer and a second cuff applied to a forearm are coupled to the elbow joint unit.

According to one aspect of the present invention, the first arm frame has an upper long side link and a lower long side link having one ends coupled to the shoulder joint unit and a short side link having both ends coupled to the other ends of the upper long side link and the lower long side link, and forms a parallel link mechanism.

According to one aspect of the present invention, the upper long side link has a downwardly curved shape, and the lower long side link has a straight shape.

According to one aspect of the present invention, a shoulder width of the shoulder frame is adjustable.

According to one aspect of the present invention, the wearing-type movement assistance device further includes a waist frame to be attached to a waist of a wearer, a lower limb frame having one end coupled to the waist frame, a lower limb drive unit that is provided in a waist joint unit of the other end of the lower limb frame and that is controlled by the control unit, and a third cuff that is coupled to the lower limb drive unit and that is applied to a thigh of a wearer.

According to one aspect of the present invention, the control unit includes a voluntary control means that performs signal processing of the biological potential signal, and that generates a voluntary command signal for generating a dynamic force, in the drive unit, according to the biological potential signal which has undergone the signal processing, an autonomous control means that generates an autonomous command signal for generating a dynamic force, in the drive unit, that adds gravity compensation and viscosity compensation, based on a length of each of frames, a relative angle between frames coupled to each joint, a weight of each of the frames, a weight of each joint, a viscosity coefficient of each joint, and an acceleration of gravity, and a composition means that combines the voluntary command signal and the autonomous command signal to generate a combined command signal, and the drive unit is driven by a drive current generated based on the combined command signal.

Advantageous Effects of Invention

According to the present invention, an intermediate joint is provided between a shoulder joint and an elbow joint to achieve a redundant degree of freedom, and thus even when joints of a wearer and the device do not have the same rotational axis, the difference of positional relationship between the joints is absorbed, and a body type difference between wearers can be coped with. Also, a sufficient degree of freedom of the upper body can be ensured. Also, a combination with a waist assistant device having a lower limb drive unit cancels a reaction force of an assistance force transmitted to the waist from the upper limb assistance device, and reduces the load to the waist of a wearer, thereby making it possible to assist anti-gravity work using an upper limb and to improve the working efficiency.

DESCRIPTION OF EMBODIMENTS

Hereinafter, an embodiment of the present invention will be described based on the drawings.

In work with a lifted posture of the upper limbs maintained, a tool is grasped in front of the body and is used by lifting the tool above. Therefore, in the wearing-type movement assistance device according to the present embodiment, the movable range of a hand is set in front of and above a wearer. Also, regarding the movable range of the trunk, the degree of freedom of the lumbar spine included in the spinal column is assumed to be restricted. This is because the waist assistance device fixes the lumbar spine and provides movement assistance while reducing the load to the endoskeleton system.

The following Table 1 shows presumed movable ranges of joints of a human body.

TABLE 1

| Part | Movement | Presumed Movable Range [deg] |
|---|---|---|
| Trunk | Rotation | 33 |
|  | Lateral Bending | 25 |
|  | Forward Bending | 23 |

TABLE 1-continued

| Part | Movement | Presumed Movable Range [deg] |
|---|---|---|
|  | Rearward Bending | 12 |
| Elbow | Bending | 140 |
|  | Extension | 0 |
|  | Pronation | 90 |
|  | Supination | 90 |
| Shoulder | Bending | 163 |
|  | Extension | 5 |
|  | Horizontal Bending | 146 |
|  | Horizontal Extension | 0 |
|  | Inward Rotation | 90 |
|  | Outward Rotation | 180 |
|  | Internal Rotation | 80 |
|  | External Rotation | 0 |

In addition, the following Table 2 shows 95% tile value, 5% tile value of the dimension of each body part of an adult male.

TABLE 2

|  | 95% Tile Value [mm] | 5% Tiel Value [mm] |
|---|---|---|
| Height | 1820 | 1612 |
| Length Between Hip joint and Lumbar | 274 | 247 |
| Length Between Hip Joint and Shoulder Joint (Min) | 510 | 462 |
| Length Between Hip Joint and Shoulder Joint (Max) | 620 | 557 |
| Upper Arm Length | 302 | 260 |
| Forearm Length | 271 | 260 |
| Acromion Width | 428 | 370 |
| Shoulder Width | 496 | 424 |
| Upper Arm Width | 145 | 109 |
| Forearm Width | 101 | 84 |

Figure 1C:
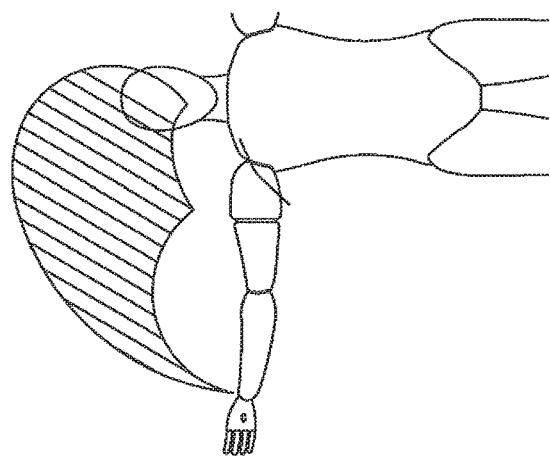
FIGS. 1a to 1c are illustrations showing a movable range of a hand and a shoulder.
Figure 1B:
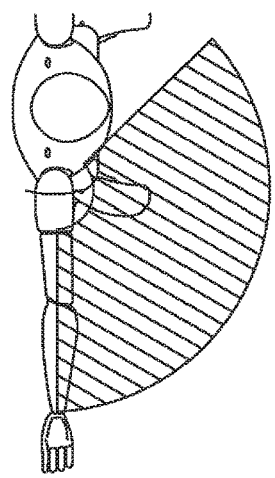
Figure 1A:
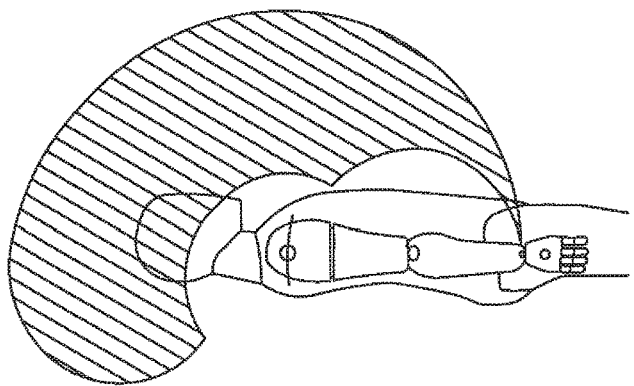

FIG. 1a to 1c show movable ranges of a hand and a shoulder, which are determined from the movable range of each joint shown in Table 1 and the dimensional values shown in Table 2. FIG. 1a shows a movable range in a sagittal plane, FIG. 1b shows a movable range in a horizontal plane, FIG. 1c shows a movable range in a frontal plane. In FIGS. 1a to 1c, an oblique line area is a movable range of a hand, and indicates an area reached by a hand when a shoulder joint and an elbow joint are moved on a plane. Also, a curve in the vicinity of a shoulder indicates a movable range of the shoulder joint position when the trunk is moved. The wearing-type movement assistance device is required to satisfy the movable range for each of the planes.

Figure 2:
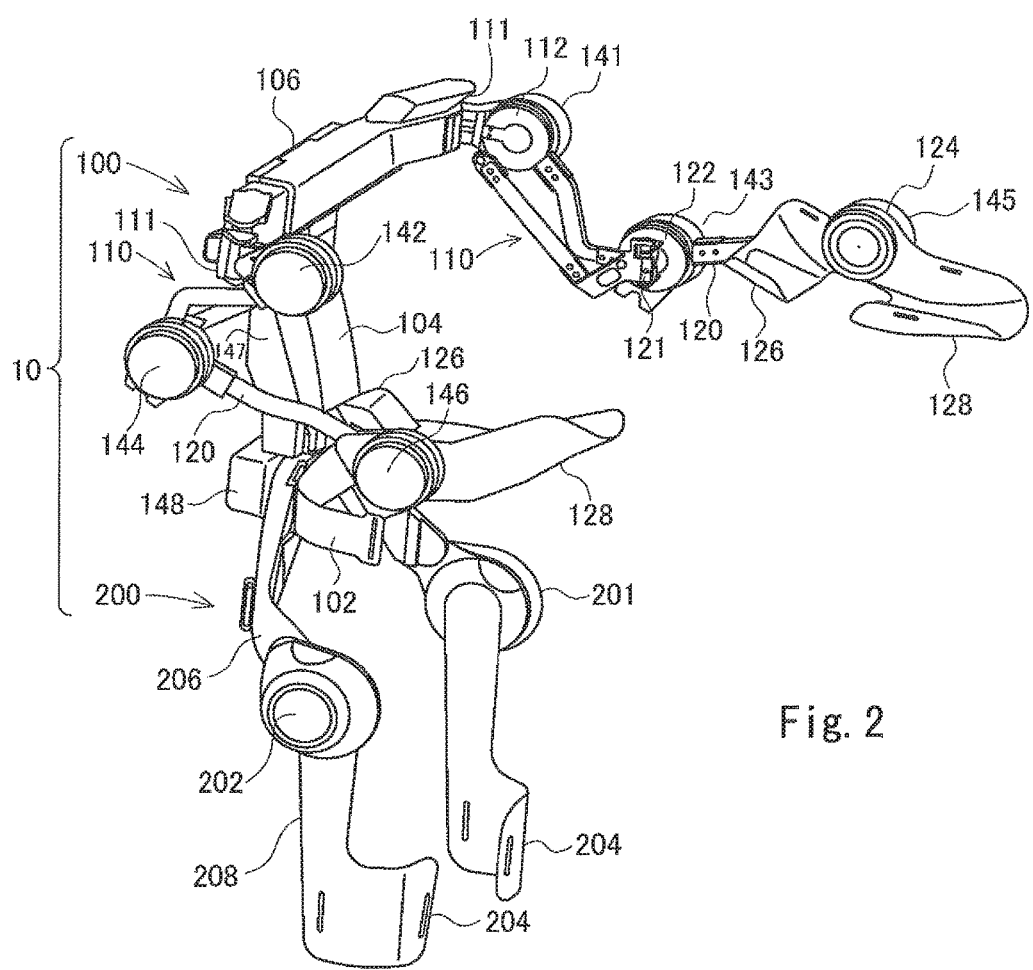
FIG. 2 is an illustration showing a wearing-type movement assistance device according to the present embodiment.

FIG. 2 is a perspective view of the wearing-type movement assistance device according to the present embodiment. The wearing-type movement assistance device 10 (hereinafter referred to as the "movement assistance device") shown in FIG. 2 is a device that supports (assists) the movement of a wearer, and operates so as to detect a biomedical signal (surface muscle potential) generated when muscular force is produced by a signal from the brain, and/or a movement angle of a joint of the wearer, and provides a driving force from a drive unit based on the detected signal.

When the wearer wearing the movement assistance device 10 makes a lifting movement of an object using both arms on its own will, a driving torque according to a biomedical signal generated at that time and/or a shoulder joint, an elbow joint, an intermediate joint between the shoulder joint and the elbow joint, a movement angle of a waist joint of the wearer, is provided from the movement assistance device 10 as an assistance force, and for instance, the object can be lifted by half a muscular power normally needed for the lifting movement. Consequently, the wearer can move the upper body by the total force of its own muscular force and a driving torque from a drive unit (an electrically operated drive motor in the present embodiment).

The movement assistance device 10 includes the upper limb assistance device 100 that assists the upper body of the wearer, and the waist assistance device 200 that assists the waist of the wearer. The waist assistant device 200 is detachable from the upper limb assistance device 100, and the waist assistant device 200 may be removed and the upper limb assistance device 100 may be used independently.

As shown in FIG. 2, the upper limb assistance device 100 includes a link structure having a waist frame 102 to be attached to the waist of a wearer, a vertical frame 104 extends upwardly of the waist frame 102, a shoulder frame 106 that is laterally provided in a shoulder width direction from the upper end of the vertical frame 104, first arm frames 110 coupled to both ends of the shoulder frame 106 via joints, and second arm frames 120 coupled to the first arm frames 110 via joints. A first arm frame 110 and a second arm frame 120 are provided correspondingly to each of the right arm and the left arm of the wearer.

The waist frame 102 is fastened to the waist of the wearer by a fastening belt which is not illustrated.

The shoulder frame 106 is coupled to the upper end of the vertical frame 104 rotatably in an approximately horizontal direction via a horizontal joint having a joint axis vertical to a horizontal plane.

One end of the first arm frame 110 is coupled to an end of the shoulder frame 106 rotatably in an approximately horizontal direction and an approximately front-back direction via a sagittal plane joint having a joint axis vertical to a sagittal plane and via a horizontal joint. The coupling portion between the shoulder frame 106 and the first arm frame 110 corresponds to the shoulder joint of the wearer, and the shoulder joint is provided with a horizontal joint unit 111 which allows rotation of the first arm frame 110 with respect to the shoulder frame 106 in an approximately horizontal direction, and a rotational joint (sagittal plane joint unit) 112 which allows rotation of the first arm frame 110 with respect to the shoulder frame 106 in an approximately front-back direction.

One end of the second arm frame 120 is coupled to the other end of the first arm frame 110 rotatably in an approximately horizontal direction and an approximately front-back direction via a horizontal joint and a sagittal plane joint. The coupling portion between the first arm frame 110 and the second arm frame 120 corresponds to an intermediate joint provided between the shoulder joint and the elbow joint, and the intermediate joint is provided with a horizontal joint unit 121 which allows rotation of the second arm frame 120 with respect to the first arm frame 110 in an approximately horizontal direction, and a rotational joint (sagittal plane joint unit) 112 which allows rotation of the second arm frame 120 with respect to the first arm frame 110 in an approximately front-back direction.

The other end of the second arm frame 120 is provided with a cuff 126 to be applied to the upper arm of the wearer and a cuff 128 to be applied to the forearm of the wearer, and the upper arm is fastened to the cuff 126 and the forearm is fastened to the cuff 128 by a fastening belt which is not illustrated. The other end of the second arm frame 120 is coupled to the cuff 128 rotatably in an approximately front-back direction via a sagittal plane joint. The other end of the second arm frame 120 corresponds to the elbow joint of the wearer, and the elbow joint is provided with a rotational joint (sagittal plane joint unit) 124 which allows rotation of the cuff 128 with respect to the second arm frame 120 in an approximately front-back direction.

The rotational joints 112, 122, 124 included in the respective sagittal plane joints of the joint units are provided with the later-described drive motors 141 to 146.

When an upper limb is lifted up to a movable range limit, the shoulder joint position in a sagittal plane is lifted. Movement of the shoulder is made by the upper-arm bone, the collar bone, the shoulder blade, and muscle groups in the vicinity of the shoulder that cause those bones to move. When an upper limb is lifted up to the limit of a movable range, the sternoclavicular joint connecting the collar bone and the breast bone is moved upward about 30 [deg] and the acromioclavicular joint connecting the collar bone and the shoulder blade is moved upward about 30 [deg]. Also, the scapulohumeral joint connecting the shoulder blade and the upper-arm bone is moved upward about 120 [deg], and as the total of these movements, the upper limb is moved upward about 180 [deg]. Due to movement the collar bone and the shoulder blade at this point, the rotational axis of the shoulder joint is lifted as seen from the sagittal plane. Movement of the trunk in a sagittal plane is forward bending and rearward bending. Since this movement also changes the position of the shoulder joint, change of the shoulder joint position is further increased. In addition, the initial position of the shoulder joint and the movable range of the hand are also changed due to a difference in limb lengths between wearers.

As shown in FIG. 2, since the upper limb assistance device 100 has an intermediate joint between the shoulder joint and the elbow joint, 2 or higher degrees of freedom is ensured in a sagittal plane, and positioning in a sagittal plane is made possible. Also, within an presumed movable range, even when joints of the wearer and the device do not have the same rotational axis, the difference of the positional relationship between the joints is absorbed. Regarding wearing of the upper limb assistance device 100 on the upper limb, when the device is fixed to the vicinity of the elbow joint of the wearer, assistance can be made, and thus the vicinity of the shoulder joint is not provided with a fastening belt or the like, and not restrained.

The link structure of the upper limb assistance device 100 has the horizontal joint units 111, 121 at the shoulder joint part and the intermediate joint part, thus can cope with horizontal movement (horizontal bending, horizontal extension) of the shoulder. Also, 2 degrees of freedom is set to the horizontal plane. For positioning in a 3-dimensional space, 3 degrees of freedom in a plane and 1 degree of freedom in another plane are necessary. Since the link structure ensures 2 or higher degrees of freedom in a sagittal plane as described above, positioning of a hand can be performed. When the horizontal plane has only 1 degree of freedom, the link structure may interfere with the trunk of a wearer. In the present embodiment, however, 2 degrees of freedom is set to the horizontal plane, and thus interference of the link structure with the trunk can be prevented.

As described above, when an upper limb is lifted, the shoulder joint position is elevated. Thus, in the link structure of the upper limb assistance device 100, the horizontal joint unit 111 of a shoulder joint part is provided rearwardly (rearwardly of the rotational joint 112 which serves as a sagittal plane joint) of the shoulder of a wearer, so that there is no structure right above the shoulder joint of the wearer.

Since the link structure of the upper limb assistance device 100 has the intermediate joint between the shoulder joint and the elbow joint, the distance on a horizontal plane between the horizontal joint units 111, 121 respectively provided at the shoulder joint part and the intermediate joint part is variable. Therefore, even when rotational axes are different between the wearer and the upper limb assistance device 100 in horizontal movement, decrease of the mobility can be prevented.

Furthermore, the coupling part between the vertical frame 104 and the shoulder frame 106, that is, the rear of the trunk of a wearer is provided with a horizontal joint, and thus the link structure of the upper limb assistance device 100 can cope with rotational movement of the trunk. Since the link structure of the upper limb assistance device 100 has a redundant degree of freedom due to the intermediate joints, even when rotational axes are different between the wearer and the upper limb assistance device 100 in rotational movement of the trunk, decrease of the mobility can be prevented.

Regarding a difference in the body thickness between wearers, the difference is coped with by inserting a buffer material between a wearer and the upper limb assistance device 100 as needed, or adjusting a fastening belt. Regarding a difference in the shoulder width between wearers, the difference is coped with by the later-described shoulder width adjustment mechanism (see FIG. 6).

Movement of the shoulder joint in a frontal plane is inward rotation and outward rotation of the shoulder, and movement of the trunk is lateral bending. Movement in a frontal plane and a dimensional difference between wearers may be considered as a combination of elements in a sagittal plane and a horizontal plane. For instance, inward rotation and outward rotation of the shoulder are a combination of bending, extension in a sagittal plane and horizontal bending, extension in a horizontal plane. Lateral bending of the trunk is a combination of a difference between initial positions of the shoulder joint in a sagittal plane, and inward rotation and outward rotation in a frontal plane. Therefore, the link structure of the upper limb assistance device 100 can cope with a movement in a frontal plane and a dimensional difference between wearers.

Figure 3:
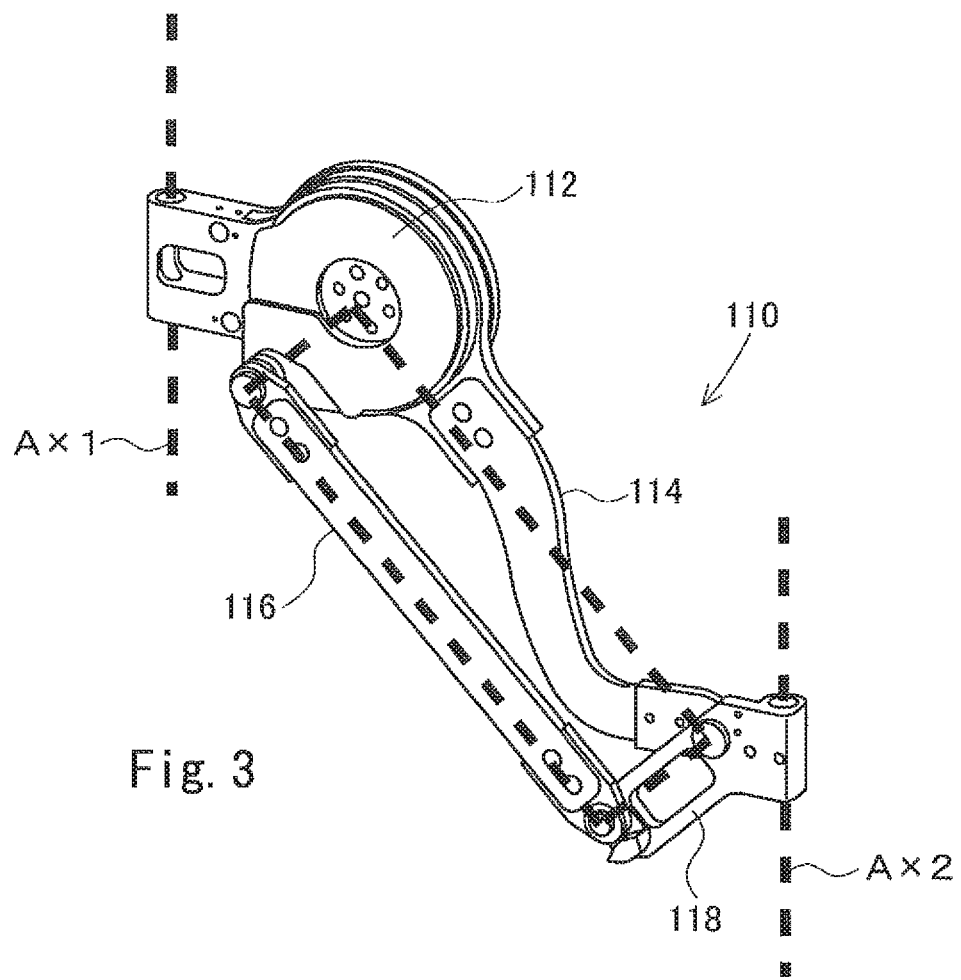
FIG. 3 is an illustration showing a first arm frame according to the present embodiment.

FIG. 3 shows the configuration of the first arm frame 110. The shoulder joint part is provided with a joint axis AX1 (rotational axis of the horizontal joint unit 111) vertical to a horizontal plane, and the rotational joint 112 which serves as a sagittal plane joint. The first arm frame 110 consists of an upper long side link 114, an lower long side link 116, and a short side link 118 provided on the side of the intermediate joint.

One ends of the upper long side link 114 and the lower long side link 116 are rotatably coupled to the rotational joint 112. Also, the other ends of the upper long side link 114 and the lower long side link 116 are rotatably coupled to both ends of the short side link 118. The vicinity of the short side link 118 is provided with a joint axis AX2 (rotational axis of the horizontal joint unit 121) vertical to a horizontal plane.

As shown in FIG. 3, the parallel link mechanism is achieved by the rotational joint 112, the upper long side link 114, the lower long side link 116, and the short side link 118. In the parallel link mechanism, a torque necessary for gravity compensation of the parallel link mechanism is constant irrespective of posture change of the link at an edge of the mechanism. This characteristic is suitable for a system that assists work for handling a heavy object.

Figure 4:
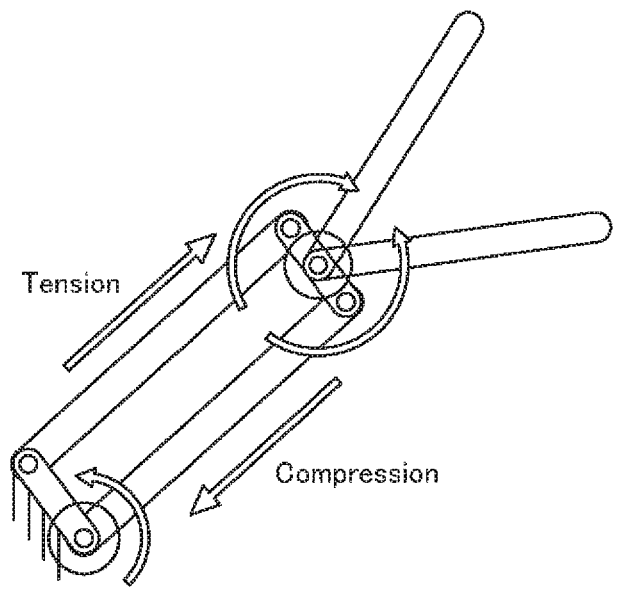
FIG. 4 is an illustration showing the principle of a parallel link mechanism.

FIG. 4 shows the principle of the parallel link mechanism. When the link at an edge of the parallel link mechanism changes the posture, a gravity compensation torque which supports the link also changes. As a reaction to the torque, in the shorter side link of the parallel link mechanism, a torque is generated in a direction opposite to the direction of the gravity compensation torque. However, the torque is supported by the long side link of the parallel link section as tensile and compressive forces. Therefore, the gravity compensation torque of the parallel link mechanism is not effected.

In the parallel link mechanism of the upper limb assistance device 100, no change occurs in the relative posture between the upper long side link 114 and the lower long side link 116 that face each other. Therefore, even when the parallel link mechanism is operated, the horizontal joint can continue to maintain the posture.

The lower long side link 116 is in a straight shape. On the other hand, the upper long side link 114 is in a downward curved shape in order to prevent interference with the horizontal joint. Although the movable range of the parallel link mechanism is 180 [deg], when links are arranged in a planar manner, the links interfere with each other, and the movable range is decreased. In the present embodiment, the upper long side link 114 and the lower long side link 116 are arranged in a three-dimensional manner, thus the movable range of 180 [deg] can be used to the fullest. Furthermore, a torsional load can be supported by the two links, thus the rigidity of the link is increased.

Figure 5:
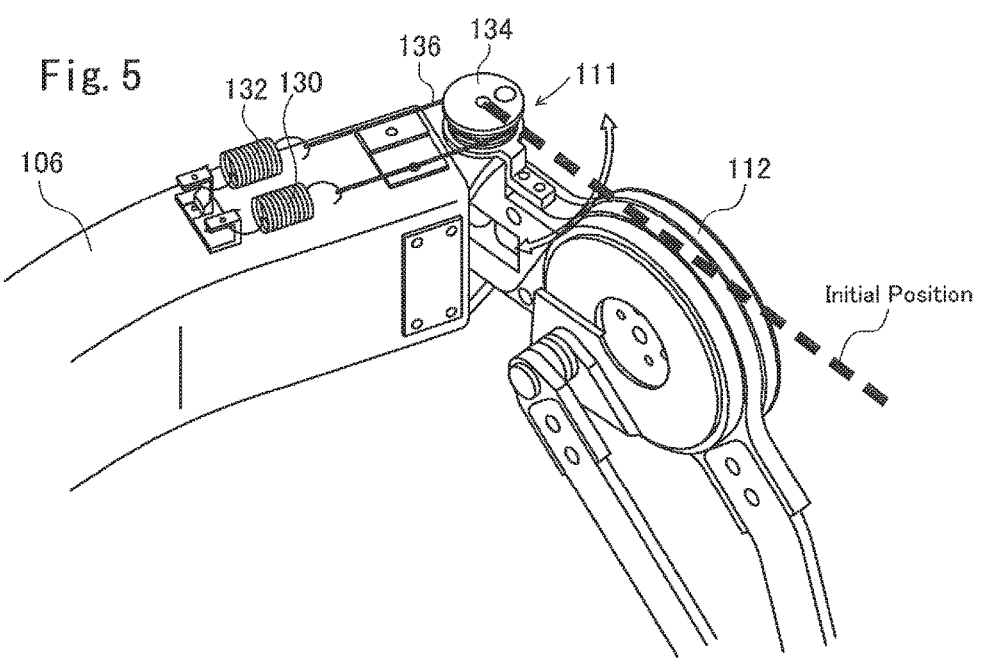
FIG. 5 is an illustration showing an origin return mechanism of a shoulder horizontal joint according to the present embodiment.

When a joint in a sagittal plane is moved, the horizontal joint unit 111, which is a passive joint, of the shoulder receives a moment in a horizontal plane. When the horizontal joint unit 111 of the shoulder is moved by the moment, the rotational axis of the rotational joint 112 may have a state where the rotational axis is vertical to a frontal plane against the intention of a wearer. In such a situation, the above-described degree of freedom is restricted and the mobility of the mechanism is significantly decreased. For this reason, as shown in FIG. 5, the upper limb support device 100 is provided with an origin return mechanism of the shoulder horizontal joint. The origin return mechanism consists of two pulling springs 130, 132 provided in the shoulder frame 106, a pulley 134 provided in the horizontal joint unit 111, and a wire 136 which is wound around the pulley 134 and has both ends respectively coupled to the pulling springs 130, 132. The tension of the pulling springs 130, 132 transmits to a shoulder horizontal joint via the wire 136, thereby making it possible to maintain the posture of the rotational axis of the sagittal plane joint (rotational joint 112) to be vertical to a sagittal plane. An intentional horizontal movement of the shoulder joint can be easily performed by the elasticity of the pulling springs 130, 132.

Figure 6:
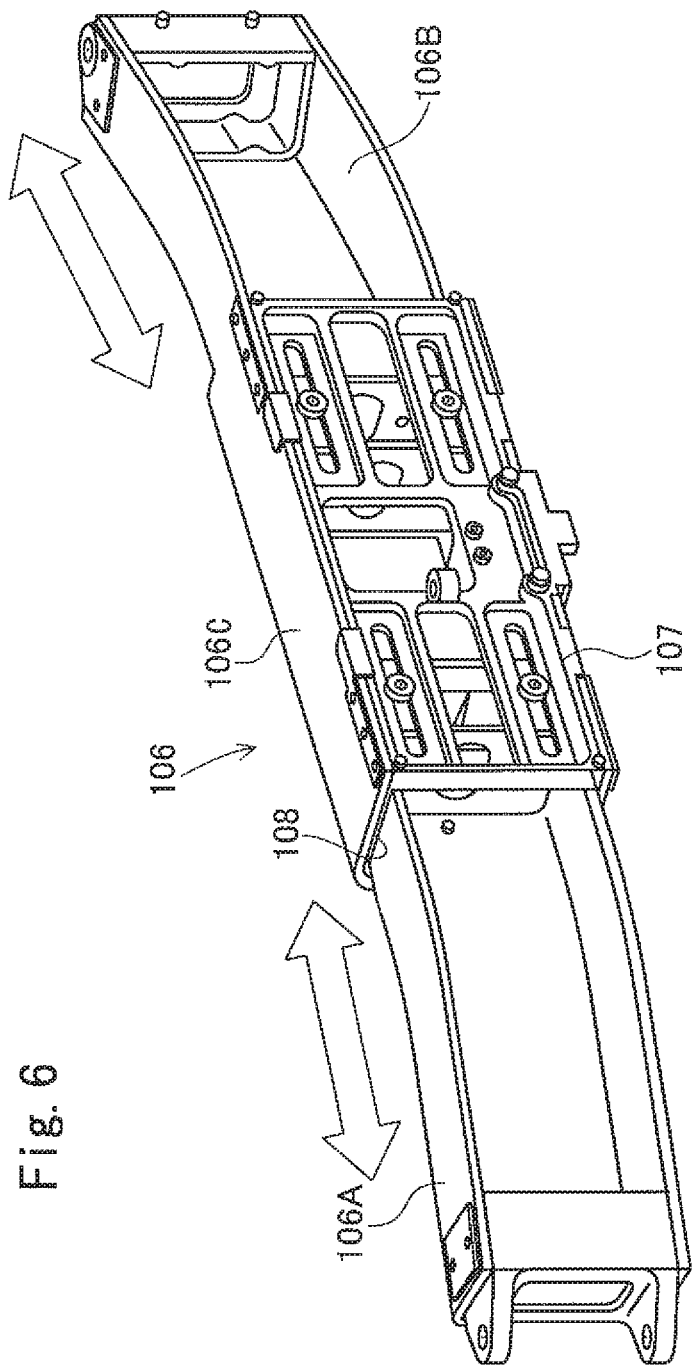
FIG. 6 is an illustration showing a shoulder width adjustment mechanism according to the present embodiment.

As shown in FIG. 6, the shoulder frame 106 has U-shaped frames 106A, 106B that extend from the right and left shoulder joint parts, and a holder frame 106C provided between the U-shaped frames 106A, 106B. The U-shaped frames 106A, 106B are slidably coupled to the holder frame 106C. Part of the U-shaped frames 106A, 106B is housed in the holder frame 106C, and the length (shoulder width) of the shoulder frame 106 can be adjusted by sliding the U-shaped frames 106A, 106B to pull out and push back the U-shaped frames 106A, 106B from and to the holder frame 106C.

A metal part (which is housed in the holder frame 106C and is not visible in FIG. 6) bonded to the U-shaped frames 106A, 106B has a screw hole, and can be fastened with a screw to a metal part 107 bonded to the holder frame 106C. The screw fastened portion is provided to prevent the U-shaped frames 106A, 106B from coming off from the holder frame 106C, and the load is held between the frames.

A sliding surface between the U-shaped frames 106A, 106B and the holder frame 106C is provided with a resin sheet 108 having an excellent sliding performance, and the shoulder width can be easily adjusted by loosening a screw at the screw fastened portion. The stroke of the shoulder width adjustment is, for instance, 50 [mm] on one side, and is able to cope with adult males with 95% tile value to 5% tile value.

In the measurement of movable ranges using the bone characteristic points, an error on the order of 10 [deg] at most occurs. When a maximum error occurs in a measured value, practically, it is regarded as if the movable range of the upper body ensured a link structure having a movable range narrower than the presumed movable range by 10 [deg]. However, a difference on the order of 10 [deg] can be complemented by moving other joints.

TABLE 3

| Part | Movement | Presumed Movable Range [deg] | Subject A | | Subject B | | Subject C | |
|---|---|---|---|---|---|---|---|---|
| | | | Worn Movable Range [deg] | Unworn Movable Range [deg] | Worn Movable Range [deg] | Unworn Movable Range [deg] | Worn Movable Range [deg] | Unworn Movable Range [deg] |
| Trunk | Rotation | 33 | 37.2 | — | 54.9 | — | 39.6 | — |
| | Lateral Bending | 25 | 27.8 | — | 25.7 | — | 33.5 | — |
| | Forward Bending | 23 | 26.9 | — | 42.2 | — | 29.3 | — |
| | Rearward Bending | 12 | 13.8 | — | 11.6 | — | 16.4 | — |
| Elbow | Bending | 140 | 126.7 | 130.4 | 135.9 | — | 120.3 | 122.1 |
| | Extension | 0 | 0 | — | 0 | — | 0 | — |
| | Pronation | 90 | 82.4 | — | 80.1 | — | 89.2 | — |
| | Supination | 90 | 75.1 | 80.1 | 81.7 | — | 82 | — |
| Shoulder | Bending | 163 | 168.9 | — | 159.1 | — | 159.1 | — |
| | Extension | 5 | 0 | — | 0 | — | 0 | — |
| | Horizontal Bending | 146 | 128.5 | 129.4 | 117.2 | 125.2 | 134.1 | 136.1 |
| | Horizontal Extension | 0 | 7.2 | — | 10.1 | — | 15.9 | — |
| | Inward Rotation | 90 | 78.8 | — | 82.2 | — | 74.6 | — |
| | Outward Rotation | 180 | 174.4 | — | 179.7 | — | 180.1 | — |
| | Internal Rotation | 80 | 63.3 | 65.2 | 71.1 | — | 74.6 | — |
| | External Rotation | 0 | 40.8 | — | 17.6 | — | 14.8 | — |

Figure 7:
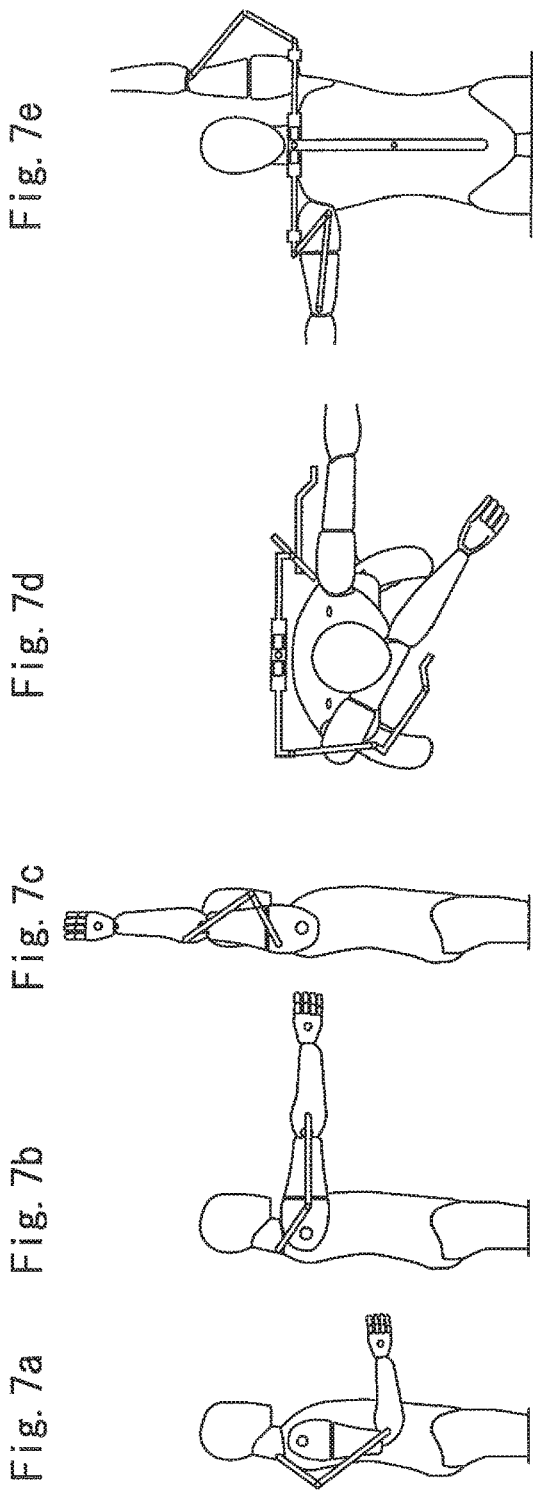
FIGS. 7a to 7e are schematic illustrations of a link structure when a wearer with the link structure of an upper limb assistance device makes a movement.

FIGS. 7a to 7e are schematic illustrations of a link structure when a wearer with the link structure of the upper limb assistance device 100 makes a movement. FIGS. 7a to 7c show a movement in a sagittal plane, FIG. 7d shows a movement in a horizontal plane, and FIG. 7e shows a movement in a frontal plane.

Figure 8:
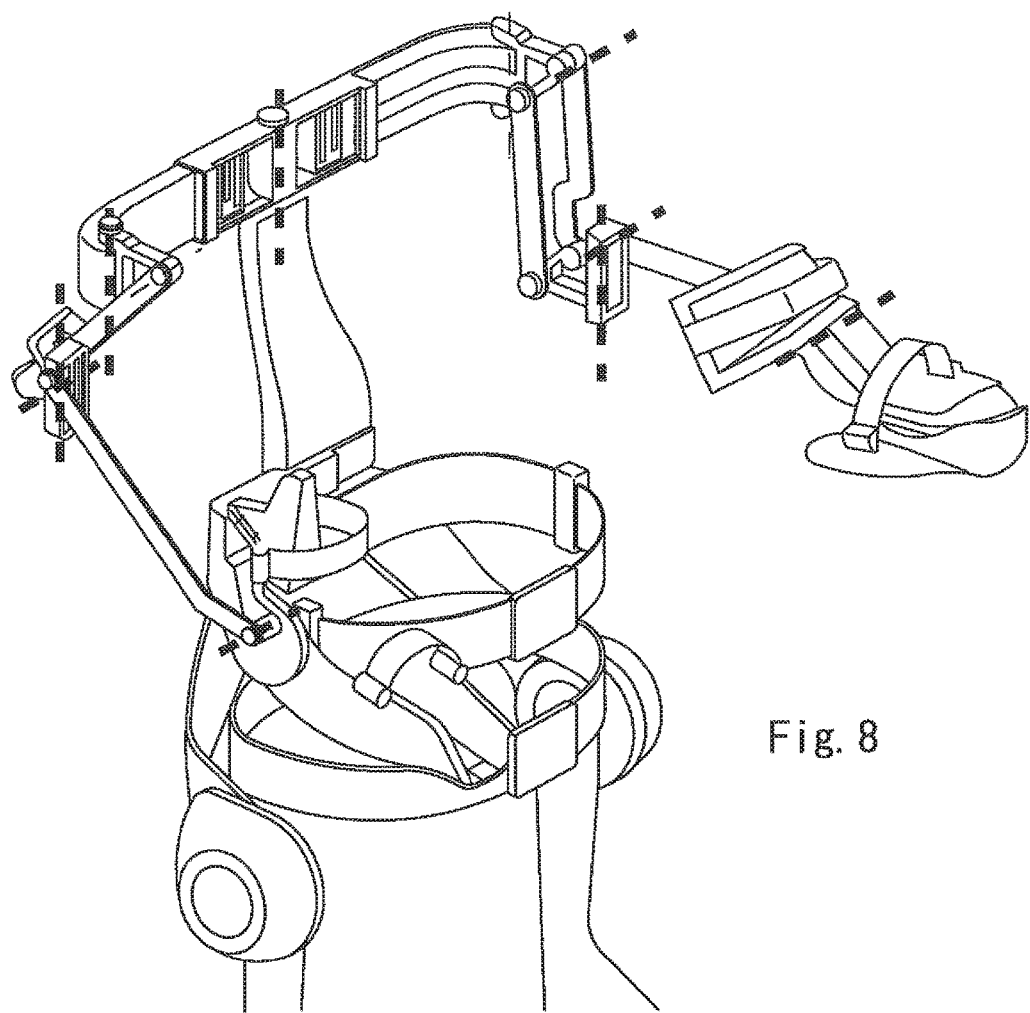
FIG. 8 is an illustration showing a resin model in the link structure of the upper limb assistance device.

Following Table 3 shows a result of measurement of movable ranges of joints when a resin model in the link structure of the upper limb assistance device 100 as shown in FIG. 8 is worn. The subjects are healthy 3 adult men, subject A with a height of 1810 [mm], subject B with a height of 1700 [mm], subject C with a height of 1550 [mm] that correspond to 95% tile value, 50% tile value, 5% tile value, respectively.

Figure 9:
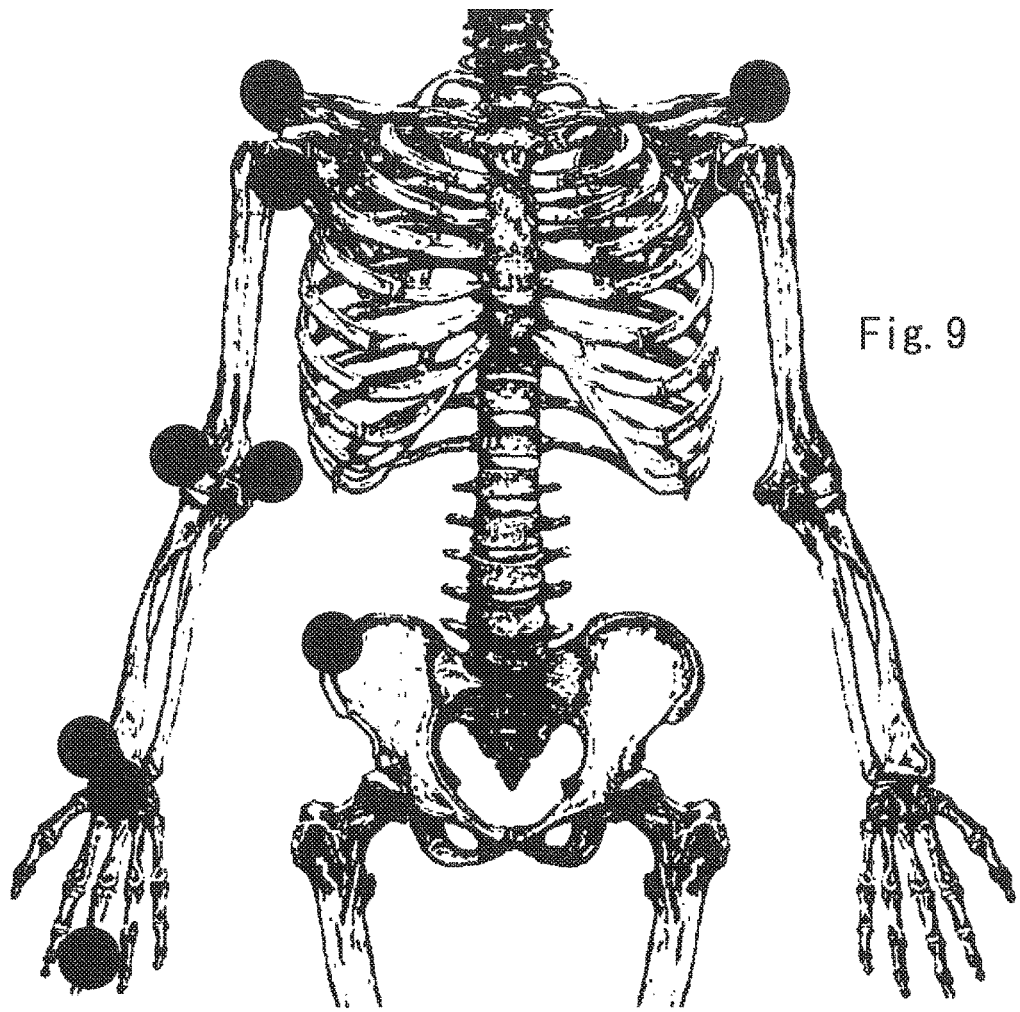
FIG. 9 is an illustration showing bone characteristic points in which markers are attached to a subject when movable ranges are measured.

A resin model in the link structure is worn by each subject, and a marker is attached to each of bone characteristic points. The black circle portions shown in FIG. 9 are marker-attached bone characteristic points. The joints are moved one at a time, a subject is photographed from 3 directions of the front, the side, the top, and a displacement of each joint angle was measured based on the relative positions of the markers on an image. Subsequently, a movable range of each joint was also measured when a movable range with the link structure worn did not satisfy a presumed movable range as well as when the link structure was not worn. The presumed movable ranges are the same as shown in Table 1.

As shown in Table 3, in some items of the elbow joint and the shoulder joint, a measured value falls below the value of the presumed movable range by 10 [deg] or greater. However, in those items, the difference between the measured values of a movable range when the link structure is worn and when the link structure is not worn did not reach 10 [deg]. Therefore, it is seen that the movable range of a joint of the wearer falls below the presumed movable range from the beginning.

From the above results, it is seen that the link structure of the upper limb assistance device 100 does not interfere with the degree of freedom of the upper body necessary for work even with the link structure worn. Although the link structure made of resin is used at the time of the above-described measurement, as long as link lengths and positional relationship between joints are not changed even after replacement with reinforcement members, the degree of freedom of the upper body is ensured.

Each frame and cuff in the link structure of the upper limb assistance device 100 have a high specific strength, and are preferably manufactured using CFRP (Carbon-Fiber-Reinforced Plastic) which has high processing flexibility when parts are molded. For instance, CFRP is molded using the autoclave molding method to manufacture a frame and the like. The cuffs 126, 128 are preferably molded integrally with a link extending from the rotational joint 124 to the cuff. This achieves weight reduction due to decrease in the number of screws used, improvement of strength due to reduction of stress concentration portion, and reduction in the number of parts. Since each joint part needs dimensional accuracy, metal parts obtained by cutting a metal member such as super-super duralumin or carbon steel are bonded.

As shown in FIG. 2, the upper limb assistance device 100 includes the drive motors 141 to 146 provided in the sagittal plane joints (rotational joints 112, 122, 124) in the link structure, a control unit 147 attached to the rear side of the vertical frame 104, and a battery 148 attached to the waist frame 102.

The drive motors 141, 142 are each provided in a position (rotational joint 112) corresponding to a shoulder joint, the first arm frames 110 are rotated by driving torques of the drive motors 141, 142. The drive motors 143, 144 are each provided in a position (rotational joint 122) corresponding to an intermediate joint, and the second arm frames 120 are rotated by driving torques of the drive motors 143, 144. The drive motors 145, 146 are each provided in a position (rotational joint 124) corresponding to an elbow joint, and the driving torques of the drive motors 145, 146 are transmitted to the forearms of a wearer as an assistance force by the cuff 128 and a fastening belt.

The horizontal joint units 111, 121 of the upper limb assistance device 100 are passive joints.

The waist assistant device 200 includes drive motors 201, 202 provided in positions corresponding to hip joints, cuffs 204 to be applied to the thighs, a lower limb frame 206 that couples the waist frame 102 and the hip joints (drive motors 201, 202), and a frame 208 that couples the cuffs 204 and the hip joints (drive motors 201, 202). It is possible to fasten the cuffs 204 to the thighs of a wearer by a fastening belt which is not illustrated. The driving torques of the drive motors 201, 202 can cancel a reaction force of an assistance force, transmitted to the waist when a wearer receives the assistance force from the upper limb assistance device 100.

The waist assistant device 200 can be connected to the upper limb assistance device 100. A connecting portion between the upper limb assistance device 100 and the waist assistant device 200 is, for instance, in a fitting structure. The surface at a fitting portion holds a load and a moment. The upper limb assistance device 100 and the waist assistant device 200 may be fitted then fastened by a screw, and can thereby be connected. Since almost no load is applied to the screw, the upper limb assistance device 100 and the hip assistant device 200 can be easily separated by just removing the screw. For instance, the frame 206 and the hip frame 102 may be removably connected. Alternatively, the frame 206 and hip frame 102 are integrally molded, and the waist frame 102 and the vertical frame 104 may be removably connected.

For the drive motors 141 to 146, 201, 202, an electric motor comprised of a Dc motor or an Ac motor may be used, and the driving torque is controlled by a control signal from the control unit 147. In addition, each drive motor includes a speed reduction mechanism that reduces a motor rotation with a predetermined speed reduction ratio. The drive motor, although being small-sized, can provide a sufficient driving force to a wearer.

The drive motors 141 to 146, 201, 202 are provided with an angle sensor that detects a joint angle. Also, the horizontal joint units 111, 121 of the shoulder joints and the intermediate joints are provided with an angle sensor that detects a joint angle. As the angle sensor, a rotary encoder can be used that counts, for instance, a number of pulses proportional to a joint angle. A detection result by the angle sensor is outputted to the control unit 147.

The upper limb assistance device 100 and the waist assistant device 200 have a biological potential sensor (not illustrated) that detects a biological potential signal such as an EMG signal or a nerve transmission signal via skin. The biological potential sensor includes an electrode for detecting a weak potential. The biological potential sensor detects a surface EMG of muscle such as deltoid muscle, biceps brachii muscle, triceps brachii muscle, flexor carpi ulnaris muscle, extensor carpi ulnaris muscle, gluteus maximus. A detected result by the biological potential sensor is outputted to the control unit 147.

In a human body, acetylcholine as a synaptic transmitter is discharged by a command from the brain to the surface of muscles that form skeletal muscles, and as a consequence, the ion permeability of a sarcolemmal membrane changes, and an action potential occurs. Then the action potential causes contraction of muscle fibers and muscle force is generated. Thus, detection of the potential of skeletal muscles enables estimation of muscle force which is generated by body movement, and it is possible to determine an assistance force (driving torque) necessary for the movement from a virtual torque based on the estimated muscle force.

The control unit 147 determines a drive current to be supplied to each drive motor, based on the biological potential signal detected by the biological potential sensor, and drives the drive motor with the drive current, thereby providing necessary assistance force (driving torque) and assisting the movement of the upper body of a wearer.

The control unit 147 has a main computer, an acceleration sensor, a signal processing circuit, etc. The battery 148 supplies power to the drive motors 141 to 146, 201, 202 and the control unit 147.

Figure 10:
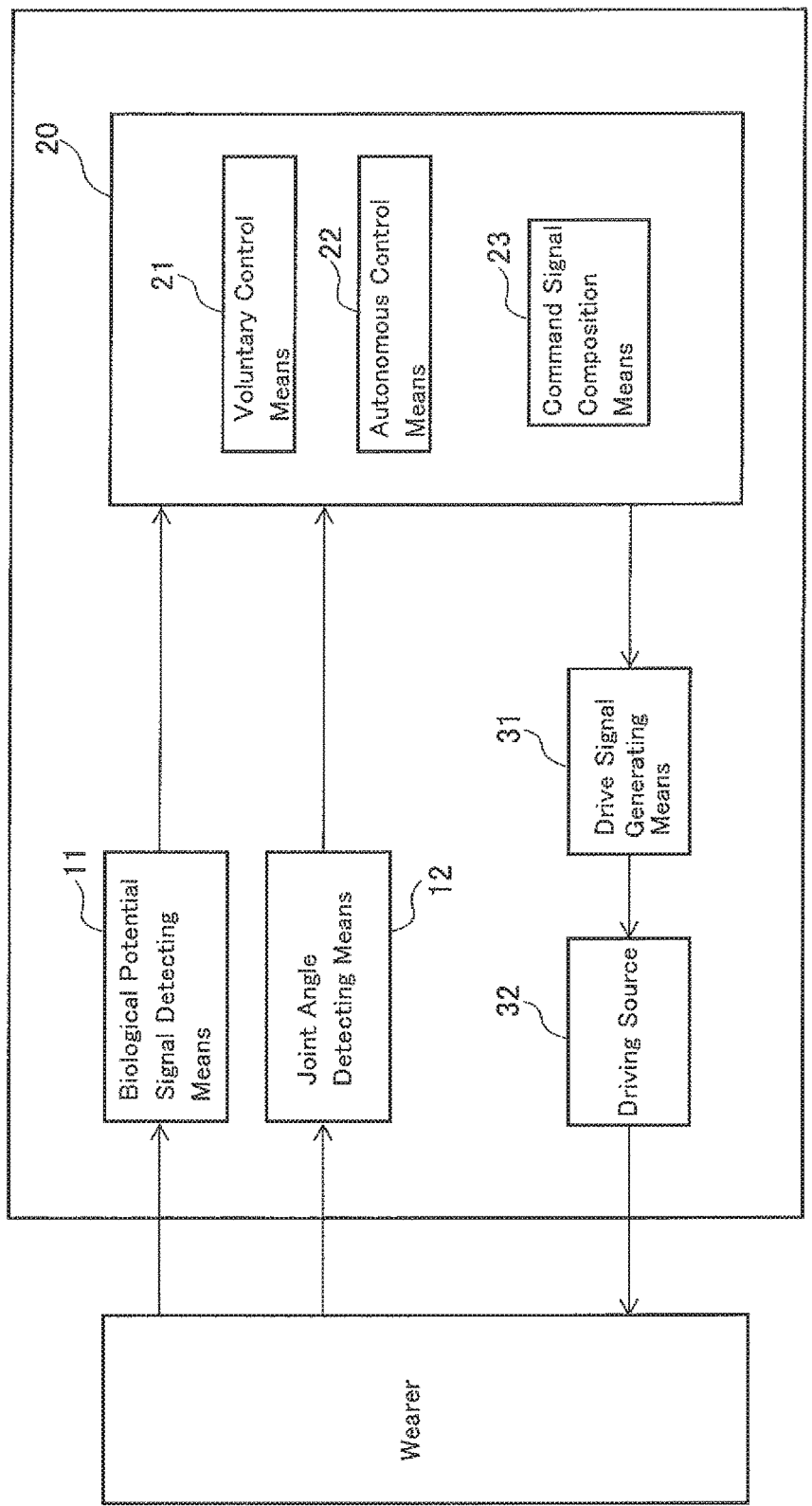
FIG. 10 is a block diagram showing a control system of the wearing-type movement assistance device according to the present embodiment.

FIG. 10 is a block diagram showing a control system of the wearing-type movement assistance device 10 according to the present embodiment. The movement assistance device 10 includes a biological potential signal detection means 11, a joint angle detection means 12, a control device 20, a drive signal generation means 31, and a driving source 32 (actuator).

The biological potential signal detection means 11 corresponds to the biological potential sensor described above. The joint angle detection means 12 corresponds to the angle sensor described above. The drive signal generation means 31 and the driving source 32 correspond to each drive motor.

The control device 20 is provided in the control unit 147, and has a voluntary control means 21, an autonomous control means 22, and a command signal composition means 23.

The voluntary control means 21 performs signal processing including filter processing (smoothing processing) and amplification on a biological potential signal detected by the biological potential signal detection means 11. The voluntary control means 21 then uses the biological potential signal which has undergone the signal processing, and generates a voluntary command signal for causing the driving source 32 to generate a dynamic force according to the intention of a wearer.

Figure 11:
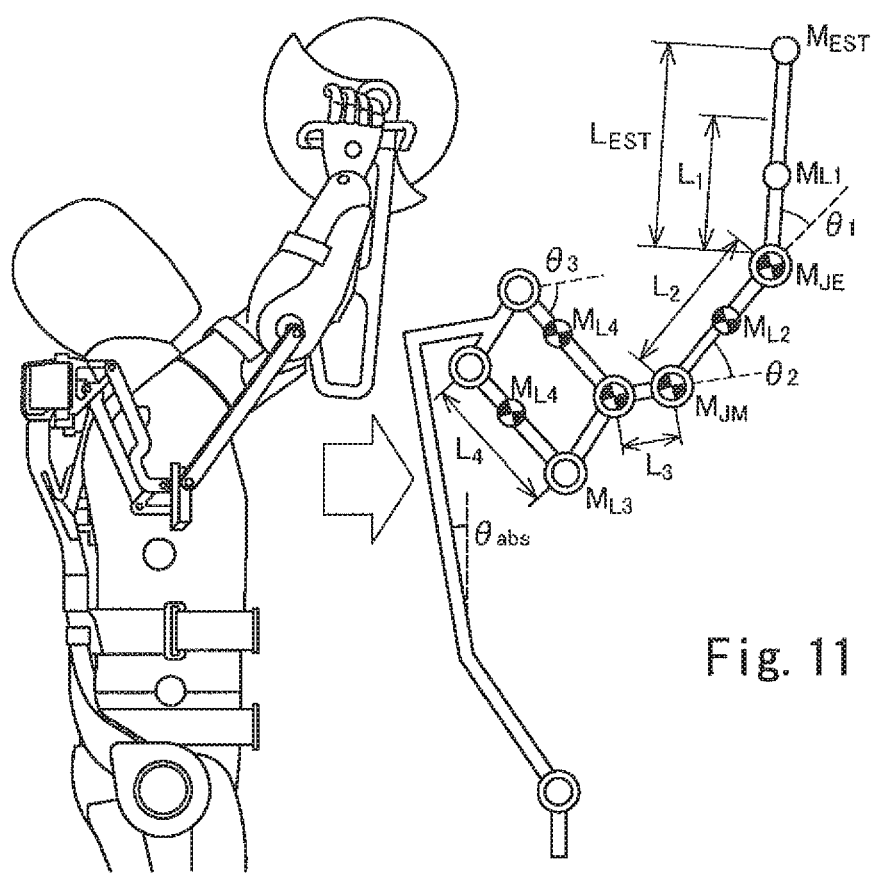
FIG. 11 is an illustration showing a link model of the wearing-type movement assistance device.

The autonomous control means 22 estimates an intention for movement of a wearer based on the information such as a joint angle detected by the joint angle detection means 12 and an acceleration detected by the acceleration sensor, and generates an autonomous command signal for causing the driving source 32 to generate a dynamic force according to the intention. Gravity compensation and viscosity compensation can be made by the autonomous command signal based on the joint angle and the acceleration. FIG. 11 shows a link model of the wearing-type movement assistance device 10. Each joint is moved according to the weight, posture, angular velocity of a tool grasped by a hand, thereby providing movement assistance. Expressions (1) to (3) show compensation torque for each joint.

[Expression]

$$\tau_e = \left(\frac{1}{2}M_{L1}L_1 + M_{Est}L_{Est}\right)g\cos(\theta_{abs} + \theta_1 + \theta_2) + D\dot{\theta}_1 \quad (1)$$

$$\tau_m = \left\{\left(\frac{1}{2}M_{L2} + M_{JE} + M_{L1} + M_{Est}\right)L_2\cos(\theta_{abs} + \theta_2) + \left(M_{Est}L_{Est} + \frac{1}{2}M_{L1}L_1\right)\cos(\theta_{abs} + \theta_1 + \theta_2)\right\}g + D\dot{\theta}_2 \quad (2)$$

$$\tau_s = (M_{L4} + M_{L3} + M_{JM} + M_{L2} + M_{JE} + M_{L1} + M_{Est}) \\ gL_4\cos(\theta_{abs} + \theta_3) + D\dot{\theta}_3 \quad (3)$$

$\dot{\theta}$[deg/s] is an angle of each joint.

$\tau_e$ [Nm] corresponds to elbow joint, $\tau_m$ [Nm] corresponds to intermediate joint, $\tau_s$ [Nm] corresponds to shoulder joint. M [kg] is the weight of a mass point representing the mass of each part. $M_{Est}$ [k9] is the weight of a tool in a hand. L [m] is the link length of each link. $L_{Est}$ [m] is the distance between an elbow joint and the centroid of a hand tool. 0 [deg] is a relative angle between links connected to joints. As an exception, $\theta_{abs}$ [deg] is the absolute angle with respect to the gravitational direction. D [Nms/rad] is the viscosity coefficient of each joint, and g [m/s²] is the acceleration of gravity.

As seen from Expression (3), for the shoulder joint, the compensation torque is determined by the posture of the shoulder joint and absolute angle. This is due to the characteristics of the parallel link mechanism that connects the shoulder joint the intermediate joint. Even if the horizontal joint unit 121 provided in the intermediate joint is moved, the compensation torque is not effected.

An autonomous command signal is generated based on the thus determined compensation torque.

The command signal composition means 23 generates a composite of a voluntary command signal generated by the voluntary control means 21 and an autonomous command signal generated by the autonomous control means 22, then outputs a composite command signal to the drive signal generation means 31.

The composite command signal has a waveform that causes the driving source 32 to generate a dynamic force that adds up a dynamic force by voluntary control that varies from the start of a movement to the end, and a dynamic force by autonomous control that makes gravity compensation and viscosity compensation.

The drive signal generation means 31 generates a drive signal (drive current) according to the composite command signal, and drives the driving source 32 by supplying the drive signal to the driving source 32. The driving source 32 provides a wearer with an assistance force (dynamic force) according to the drive signal.

Figure 12A:
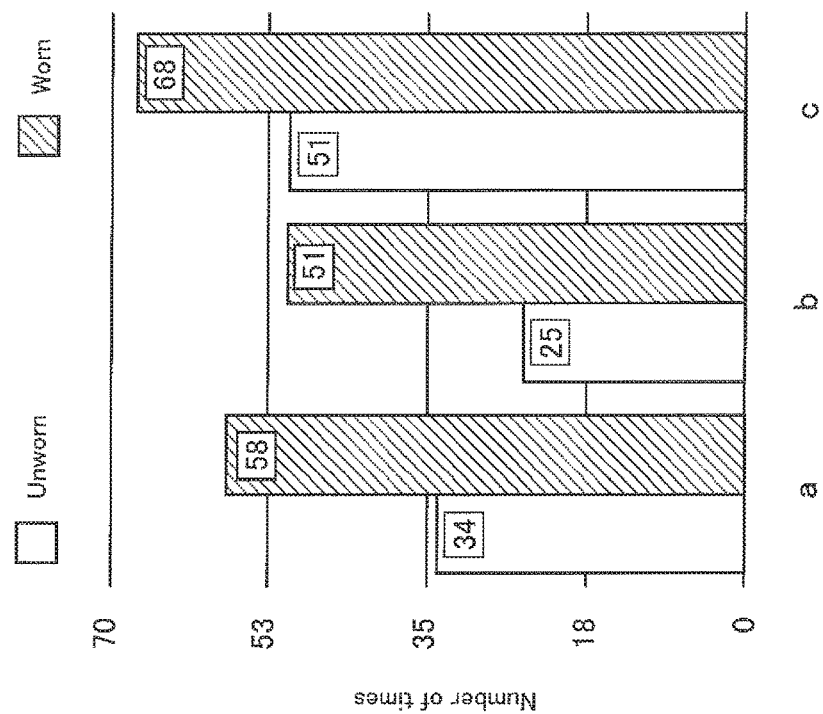
FIG. 12a is a graph showing continuation times of anti-gravity work.
Figure 12B:
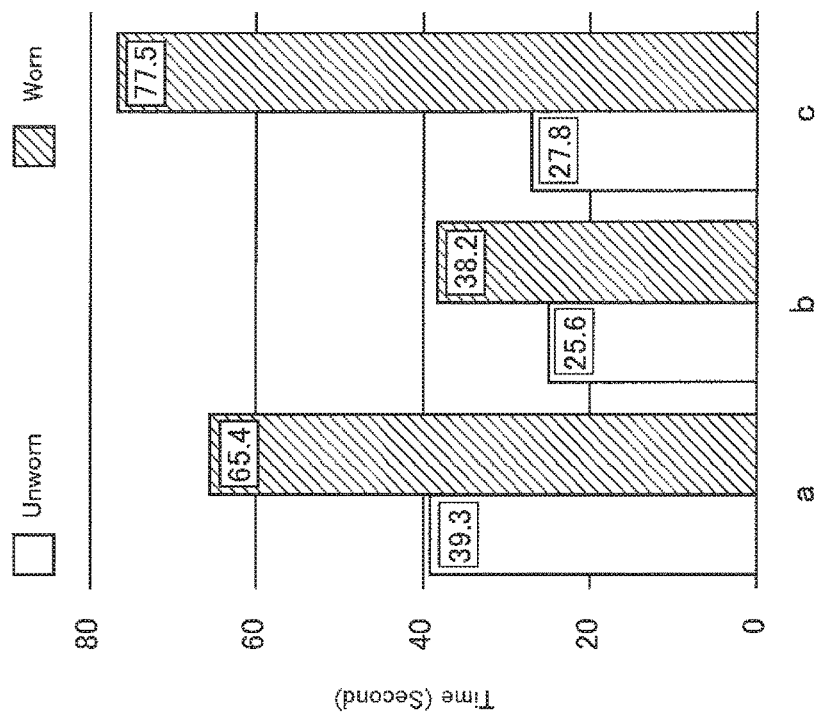
FIG. 12b is a graph showing the number of movements when the wearing-type movement assistance device is worn and when the wearing-type movement assistance device is not worn.

FIGS. 12a, 12b show measurement results of a holding time of a tool (FIG. 12a) and the number of times of vertical movements (FIG. 12b) when such movement assistance device 10 is worn and when the movement assistance device 10 is not worn. The subjects are healthy 3 adult men a, b, c. Also, an experiment with wearing the device was conducted first, and subsequently, an experiment without wearing the device was conducted.

In a static experiment in which a tool (heavy object) is held above the head, a heavy object with 30 [kg] was used. The heavy object was lifted above a base table, the heavy object was held above the head, and when the limit of holding is reached, the heavy object was returned to the base table. The time from the moment when the heavy object was separated from the base table until the heavy object was returned to the base table was measured as the holding time. FIG. 12a shows an experimental result of the static experiment. For all the subjects, the holding time was increased by wearing the movement assistance device 10. The holding time was increased to 2.8 times for a subject having a greatest increase. It is seen from this that the movement assistance device 10 can assist a static movement.

In an experiment (dynamic experiment) in which the heavy object is moved up and down above the head, a reaction force simulation heavy object with 10 [kg] was used. The heavy object was lifted above the base table, the reaction force simulation heavy object was moved up and down above the head, and when the limit of the up-and-down movement is reached, the heavy object was returned to the base table. The number of times of up-and-down movements was measured during the time from the moment when the heavy object was separated from the base table until the heavy object was returned to the base table. For up-and-down movement, the following process was measured as 1 movement: the reaction force simulation heavy object is lifted by 100 [mm] from an initial position, and subsequently, the heavy object is returned to the initial position. FIG. 12b shows an experimental result of the dynamic experiment. For all the subjects, the number of times of up-and-down movements was increased by wearing the movement assistance device 10. The number of times of up-and-down movements was increased to 2.0 times for a subject having a greatest increase. It is seen from this that the movement assistance device 10 can assist a dynamic movement.

In this manner, according to the present embodiment, a redundant degree of freedom is given to the link structure by providing an intermediate joint between the shoulder joint and the elbow joint of the upper limb assistance device 100. Also, the horizontal joint unit 111 of the shoulder joint is provided rearwardly of the shoulder, which does not interfere with elevation of the shoulder joint position when an upper limb is lifted. Thus, even when the upper limb assistance device 100 is worn, the degree of freedom of the upper body a wearer can be ensured.

With the intermediate joint provided, even when joints of the wearer and the upper limb assistance device 100 do not have the same rotational axis, the difference of the positional relationship between the joints is absorbed. Also, the shoulder frame 106 is provided with the shoulder width adjustment mechanism. Therefore, the upper limb assistance device 100 can cope with a body type difference between wearers.

The sagittal plane joint of the upper limb assistance device 100 is provided with a drive motor, and the drive motor provides an assistance force, thereby making it possible to improve the working efficiency for anti-gravity work.

Also, a combination of the upper limb assistance device 100 and the waist assistant device 200 can cancel a reaction force of an assistance force transmitted to the waist from the upper limb assistance device 100, and can reduce the load to the waist of a wearer.

The prepreg lamination structure of CFRP members included in each frame of the upper limb assistance device 100 in the embodiment may be determined from a result of strength analysis by simulation. For the joint parts of the upper limb assistance device 100 and the metal parts provided in the shoulder frame 106, an isotropic material such as super-super duralumin or carbon steel is used, thus analysis using a solid model is conducted. The CFRP included in each frame is an anisotropic material, thus analysis using a surface model, which enables composite shell analysis, is conducted. In the composite shell analysis, analysis can be conducted by taking a fiber direction and a lamination structure of composite materials into consideration. The surface model is a model with a thickness of zero, there are some cases where analysis is not possible in an assembly state. In that case, analysis is conducted using an assembly model with single parts or a minimum number of parts relevant to the analysis result.

When a stress generated in parts exceeds an allowable stress of the parts, the parts is broken. An index indicating how much margin a stress generated in parts has with respect to an allowable stress is called a safety factor. When the safety factor is 1, the allowable stress and the stress generated in parts are in an equal state, and thus the parts is not broken. A structural member is designed so that the safety factor thereof is 2 or higher in consideration of a torsional load.

As criteria for determination of breakage of an isotropic material, Maximum von Mises stress (Mises stress) is used. Maximum von Mises stress is such that a stress generated by a composite load from a plurality of directions is projected on a tensile or compressive stress in one direction. Tsai-Wu rule is used for determination of breakage of CFRP which is an anisotropic material. In the Tsai-Wu rule, a safety factor can be derived by separating allowable compressive and tensile stresses. This is determination criteria suitable for analysis of CFRP in which allowable compressive and tensile stresses vary according to a fiber direction.

Strength analysis is for checking whether a designed link structure has a sufficient strength against expected loads. The posture of the link structure is assumed to have two types: one is the case where an upper arm is lifted up to 135 [deg] and a tool is grasped with an forearm vertical to the ground, and the other is the case where a tool is grasped in the front plane of the belly. The moment length as seen from the hip joint of a wearer in a sagittal plane is 140 [mm] at the time of lifting, 200 [mm] at the time of holding in the front plane of the belly. The load is set to 150 [N] for a single arm, 300 [N] for both arms based on the maximum weight of a tool used, and is transmitted to the mechanism via the forearm and the upper arm. In analysis of partial assembly, a portion expected to be structurally restrained is fixed. A load is given that corresponds to the case where analysis is conducted in an entire assembly state using a remote load function of simulation software. The safety factors for all the parts are calculated by simulation, and a prepreg lamination structure of CFRP is determined so that these factors are greater than or equal to predetermined values.

It should be noted that the present invention is not limited to the embodiment described above, and in an implementation stage, components may be modified without departing from the gist of the present invention. In addition, a plurality of components disclosed in the embodiment described above may be combined as needed, or some components may be eliminated from the entire components shown in the embodiment. Furthermore, components in different embodiments may be combined as needed.

Although the present invention has been described in detail using specific aspects, it is apparent for those skilled in the art that various changes may be made without departing from the spirit and scope of the present invention. The present application is based on Japanese Patent Application No. 2014-122483 filed on Jun. 13, 2014, the entire contents of which are incorporated by reference.

REFERENCE SIGNS LIST 10 movement assistance device
100 upper limb assistance device
102 waist frame
104 vertical frame
106 shoulder frame
110 first arm frame
120 second arm frame
141 to 146 drive motor
200 waist assistance device
201, 202 drive motor

The invention claimed is:

1. A wearing-type movement assistance device comprising:
 a frame to be worn on an upper limb of a wearer;
 a drive unit provided in each of joints of the frame;
 a biomedical signal detection unit detecting a biological potential signal of the wearer;
 a joint angle detection unit detecting an angle of each joint;
 a control unit controlling the drive unit based on the biological potential signal and the angle of each joint,
 wherein the frame includes
 a vertical frame that extends in a vertical direction,
 a shoulder frame that is laterally provided in a shoulder width direction from an upper end of the vertical frame and has an end,
 a shoulder joint unit provided with the drive unit and attached to the end of the shoulder frame,
 a first arm frame having one end coupled to the end of the shoulder frame via the shoulder joint unit, and another end,
 an intermediate joint unit provided with the drive unit and attached to the another end of the first arm frame,
 an elbow joint unit provided with the drive unit, and
 a second arm frame having one end coupled to the another end of the first arm frame via the intermediate joint unit, and another end connected to the elbow joint unit.

2. The wearing-type movement assistance device according to claim 1, wherein the shoulder joint unit has a horizontal joint and a sagittal plane joint, the sagittal plane joint is provided with the drive unit, and the horizontal joint is a passive joint.

3. The wearing-type movement assistance device according to claim 2, wherein the horizontal joint of the shoulder joint unit is provided rearwardly of the sagittal plane joint.

4. The wearing-type movement assistance device according to claim 2, wherein a spring tension is applied to the horizontal joint via a wire so that a rotational axis of the sagittal plane joint is perpendicular to a sagittal plane.

5. The wearing-type movement assistance device according to claim 1, wherein the intermediate joint unit has a horizontal joint and a sagittal plane joint, the sagittal plane joint is provided with the drive unit, and the horizontal joint is a passive joint.

6. The wearing-type movement assistance device according to claim 1, wherein the elbow joint unit has a sagittal plane joint, and the sagittal plane joint is provided with the drive unit.

7. The wearing-type movement assistance device according to claim 6, wherein a first cuff applied to an upper arm of the wearer and a second cuff applied to a forearm are coupled to the elbow joint unit.

8. The wearing-type movement assistance device according to claim 1, wherein the first arm frame has an upper long side link and a lower long side link having ends coupled to the shoulder joint unit and a short side link having ends coupled to other ends of the upper long side link and the lower long side link, and forms a parallel link mechanism.

9. The wearing-type movement assistance device according to claim 8, wherein the upper long side link has a downwardly curved shape, and the lower long side link has a straight shape.

10. The wearing-type movement assistance device according to claim 1, wherein a shoulder width of the shoulder frame is adjustable.

11. The wearing-type movement assistance device according to claim 1, further comprising:
- a waist frame to be attached to a waist of the wearer;
- a lower limb frame having one end coupled to the waist frame;
- a lower limb drive unit that is provided in a waist joint unit of another end of the lower limb frame and that is controlled by the control unit; and
- a third cuff that is coupled to the lower limb drive unit and that is applied to a thigh of the wearer.

12. The wearing-type movement assistance device according to claim 1, wherein the control unit includes
- a voluntary control means that performs signal processing of the biological potential signal, and that generates a voluntary command signal for generating a dynamic force, in the drive unit, according to the biological potential signal which has undergone the signal processing,
- an autonomous control means that generates an autonomous command signal for generating a dynamic force, in the drive unit, that adds gravity compensation and viscosity compensation, based on a length of each of frames, a relative angle between frames coupled to each joint, a weight of each of the frames, a weight of each joint, a viscosity coefficient of each joint, and an acceleration of gravity, and
- a composition means that combines the voluntary command signal and the autonomous command signal to generate a combined command signal, and
- the drive unit is driven by a drive current generated based on the combined command signal.

13. The wearing-type movement assistance device according to claim 1, wherein the shoulder frame extends substantially parallel to a surface on which the wearer stands when worn by the wearer.

14. The wearing-type movement assistance device according to claim 1, wherein the frame further includes
- another shoulder joint unit provided with the drive unit,
- a third arm frame having one end coupled to another end of the shoulder frame via the another shoulder joint unit,
- another intermediate joint unit provided with the drive unit,
- another elbow joint unit provided with the drive unit, and
- a fourth arm frame having one end coupled to an end of the third arm frame via the another intermediate joint unit and other end connected to the another elbow joint unit.

* * * * *